(12) United States Patent
Arita et al.

(10) Patent No.: US 8,644,698 B2
(45) Date of Patent: Feb. 4, 2014

(54) FOCUSING-STATE DETECTION APPARATUS, IMAGING APPARATUS, AND ITS CONTROL METHOD

(75) Inventors: Hiroshi Arita, Kawasaki (JP); Takeshi Sakaguchi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/869,537

(22) Filed: Aug. 26, 2010

(65) Prior Publication Data
US 2011/0052169 A1 Mar. 3, 2011

(30) Foreign Application Priority Data

Aug. 31, 2009 (JP) .................................. 2009-200243

(51) Int. Cl.
*G03B 13/34* (2006.01)
(52) U.S. Cl.
USPC .......................................... 396/123; 348/349
(58) Field of Classification Search
USPC .......................................... 396/123; 348/349
See application file for complete search history.

(56) References Cited

U.S. PATENT DOCUMENTS

| | | | |
|---|---|---|---|
| 6,819,360 B1 * | 11/2004 | Ide et al. | 348/340 |
| 7,512,330 B2 | 3/2009 | Ichimiya | |
| 7,734,164 B2 | 6/2010 | Ichimiya | |
| 2006/0127080 A1 * | 6/2006 | Mori et al. | 396/121 |
| 2006/0133792 A1 * | 6/2006 | Ide | 396/111 |
| 2006/0177210 A1 | 8/2006 | Ichimiya | |
| 2007/0263997 A1 * | 11/2007 | Hirai et al. | 396/123 |
| 2009/0180772 A1 | 7/2009 | Ichimiya | |
| 2010/0013947 A1 * | 1/2010 | Oikawa | 348/222.1 |
| 2010/0110178 A1 * | 5/2010 | Isobe et al. | 348/135 |

FOREIGN PATENT DOCUMENTS

JP 2006-220684 A 8/2006

* cited by examiner

*Primary Examiner* — Christopher Mahoney
*Assistant Examiner* — Fang-Chi Chang
(74) *Attorney, Agent, or Firm* — Canon USA, Inc. IP Division (57) ABSTRACT

In an apparatus having a vertical focusing-state detection area and a lateral focusing-state detection area in a cross focusing point, wherein either one of the focusing-state detection areas has a calculation range that is overlapping with the adjacent focusing point, a photographing result desired by a photographer can be obtained without bringing into focus a subject in the focusing point adjacent to the cross focusing point selected by the photographer.

15 Claims, 11 Drawing Sheets

FOCUSING-STATE DETECTION APPARATUS, IMAGING APPARATUS, AND ITS CONTROL METHOD

BACKGROUND OF THE INVENTION

1. Field of the Invention

The present invention relates to a technique for detecting a defocus amount from a phase difference of an image passing through a different pupil area.

2. Description of the Related Art

There has conventionally been a technique of detecting a focusing state of an optical system by changing an accumulation area of a photoelectric conversion element group in an AF sensor. For example, a technical concept has been discussed, in which a signal is output as an accumulation area is changed, so that the number of the focusing-state detection areas is secured or increased, and a detection time can be shortened even if the defocus amount is great (see Japanese Patent Application Laid-Open No. 2006-220684).

There arises a need to increase the number of the focusing-state detection areas, in general. When this need is to be met, there arises an issue how the AF sensor is controlled or how the defocus amount is detected with the use of the output from the AF sensor, since the adjacent focusing-state detection areas come close to each other. When at least a part of the focusing-state detection area is shared by two AF frames, there is a technical issue. Namely, a user who selects a desired AF frame by visually confirming the AF frame, needs to be provided with a technique of detecting a focusing state, which reduces a possibility that a subject in an AF frame different from a desired AF frame is brought into focus.

SUMMARY OF THE INVENTION

According to an aspect of the present invention, an apparatus detects a focusing state of an optical system based on a detection area of a photoelectric conversion element including plural pixels receiving a light flux from a subject space, and on an output of the detection area. The apparatus includes a selection unit including detection areas corresponding to plural AF frames respectively, and configured to select, from outputs of the detection areas, an output of the detection area for controlling the optical system, and a controller configured to control a drive of the optical system based on the selected output of the detection area, wherein the selection unit makes it difficult to select, from the plurality detection areas, the output having a part overlapping with an AF frame, on a primary imaging surface, compared to the output not having the overlapping part.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

<Configuration of Camera Serving as Imaging Apparatus>

Figure 1:
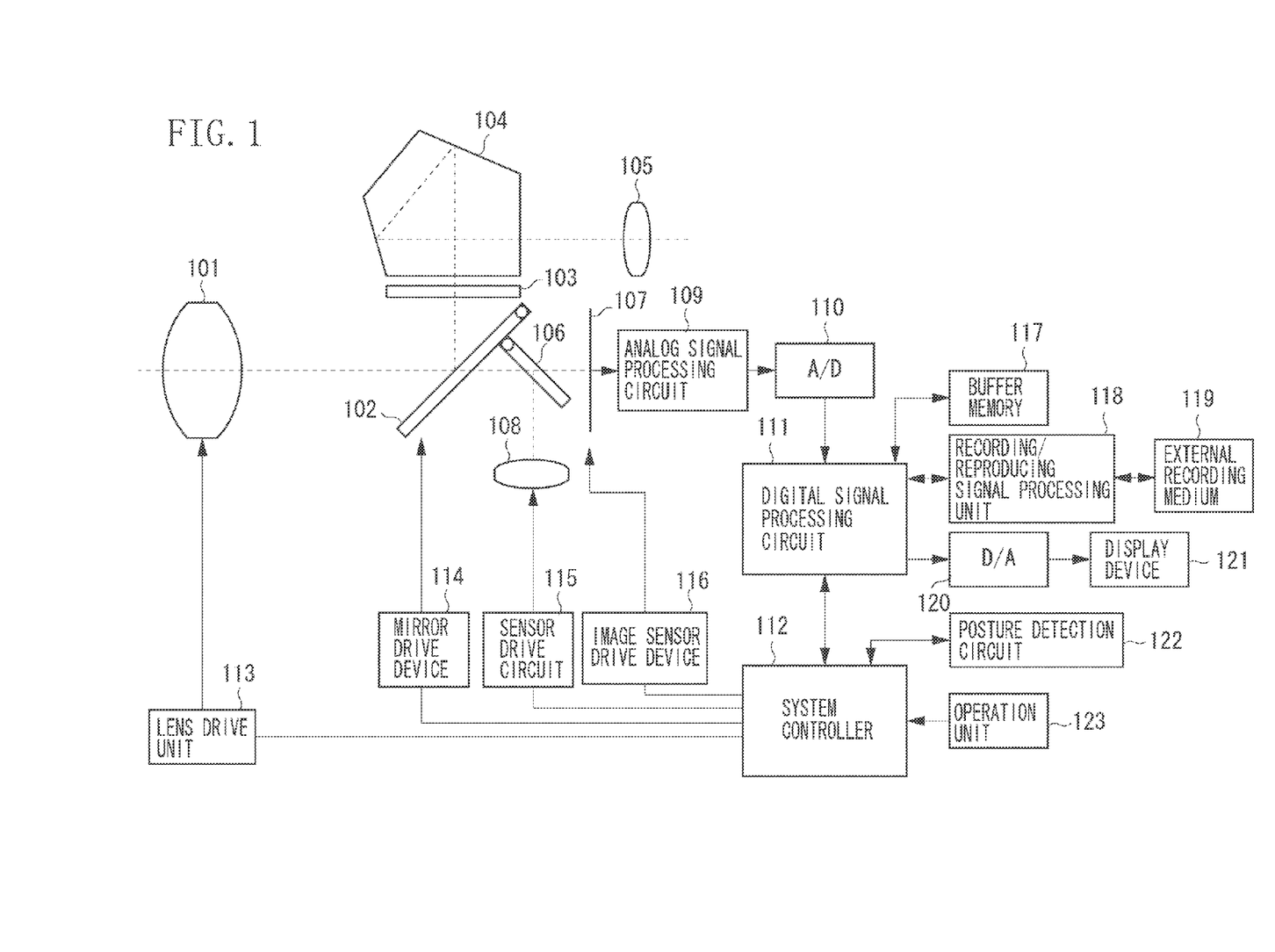
FIG. 1 is an explanatory view illustrating an imaging apparatus according to an exemplary embodiment.

FIG. 1 is an example in which the present invention is embodied as a camera serving as an imaging apparatus for practicing the present invention.

A photographing lens 101 is illustrated in FIG. 1 as one lens to simplify the description. The photographing lens 101 may be provided at a lens barrel mounted on the imaging apparatus or on a lens barrel that is exchangeable with the imaging apparatus. An image sensor 107, such as a charge-coupled device (CCD) or a complementary metal-oxide semiconductor (CMOS) sensor, images an optical image of a subject passing through the photographing lens 101. It converts the optical image into charges according to the light quantity of the captured optical image of the subject, and outputs the resultant charges as an electric signal.

A main mirror 102 has a semi-transmissive part. The main mirror 102 retracts to the outside of a photographing light flux in order not to scatter the light flux passing through the photographing lens 101 during a photographing process. The main mirror 102 is diagonally provided in the optical path through which the photographing light flux passes during a focus detection described below. FIG. 1 illustrates a case in which the main mirror 102 is inserted into the optical path through which the photographing light flux passes (mirror-down state).

The main mirror 102 directs some light fluxes passing through the photographing lens 101 to a finder optical system, which includes a focus plate 103, pentaprism 104, and an eyepiece lens 105, being diagonally provided in the photographing optical path.

A sub-mirror 106 can be folded from the opened state or can be opened from the folded state with respect to the main mirror 102 in synchronism with the operation of the main mirror 102. Some light fluxes passing through the semi-transmissive part of the main mirror 102 are reflected downward by the sub-mirror 106 so as to be incident on a below-described focus detection device 108 of a phase difference system, whereby a defocus amount of the photographing lens 101 to a subject is detected.

A system controller 112 includes a central processing unit (CPU) that controls the entire camera and a random access memory (RAM) serving as a storage device, and it appropriately controls the operations of the respective units described below.

A lens drive device 113 is connected to the system controller 112, and includes a communication circuit for performing a communication with the photographing lens 101, a lens drive mechanism that drives lenses for performing a focus adjustment, and a drive circuit thereof.

A mirror drive circuit 114 is connected to the system controller 112 to drive the main mirror 102 to the outside of the photographing light flux of the photographing lens 101. A sensor control circuit 115 is connected to the system controller 112 to control the focus detection device 108. An image sensor drive device 116 is connected to the system controller 112 to drive the image sensor 107.

A digital signal processing circuit 111 is connected to the system controller 112. The electric signal according to the optical image of the subject imaged on the image sensor 107 is input into an analog signal processing circuit 109. The electric signal input into the analog signal processing circuit 109 is converted into a digital signal from the analog signal by an analog/digital (A/D) converter 110, and the digital signal processing circuit 111 performs an imaging process, such as a shading correction or a gamma correction, on this signal, and outputs the resultant signal as image data.

The image sensor 107 is provided with a focus-detection pixel that receives a light flux at a pair of partial areas of an exit pupil area of the photographing lens 101. The digital signal processing circuit 111 is provided with a detection circuit that detects a focusing state, such as a defocus amount, of the photographing lens 101 as to the subject by the electric signal output from the focus-detection pixel.

A frame memory 117 is connected to the digital signal processing circuit 111, and can store image signal data corresponding to plural frames imaged by the image sensor 107. The signal subjected to the A/D conversion is temporarily stored in the buffer memory 117.

The digital signal processing circuit 111 reads the image signal data stored in the buffer memory 117 to perform the respective processes described above, and the processed image signal data is stored again in the buffer memory 117.

A recording/reproducing signal processing circuit 118 is connected to the digital signal processing circuit 111. The recording/reproducing signal processing circuit 118 temporarily stores the image data, which is subjected to various processes at the digital signal processing circuit 111, into the buffer memory 117, and then, records the image data into an external storage medium 111 such as a memory card as an image file. The image data is recorded into the external storage medium 111 here, but it may be transmitted to the Internet by providing a communication unit separately.

When the image data is recorded on the external storage medium 119 or transmitted to the Internet, the image data is compressed, for example, using Joint Photographic Experts Group (JPEG) format. On the other hand, when the image data is read from the external storage medium 119 or downloaded from the Internet, the recording/reproducing signal processing circuit 118 decompresses the image data. The recording/reproducing signal processing circuit 118 includes an interface that performs a data communication with the storage medium 119.

A display device 121 displays a captured image. The display device 121 is also used to reproduce and display the image signal data recorded onto the recording medium 119.

When an image is displayed onto the display device 121, the image signal data stored in the buffer memory 117 is read, and then, digital image data is converted into an analog video signal by a D/A converter 120.

The image is displayed onto the display device 121 by using the analog video signal.

There are two manners to display the image captured by the image sensor 107, onto the display device 121. In one display manner, a release operation is not performed, which is a display manner termed 'through image' that updates and displays one by one the image which is repeatedly captured by the image sensor 107.

The other one is a display manner termed 'freeze image', in which the image captured by the image sensor 107 is displayed for a predetermined time after the release operation of the camera is performed.

A posture detection circuit 122 is connected to the system controller 112 for detecting the posture of the camera.

A gyroscope, which measures an angle or angular speed of an object, may be used to detect the posture of the camera.

An operation unit 123 is connected to the system controller 112, and is provided with operation members for operating the camera, including a power supply switch for turning on/off a power supply of the camera, a release button, or setting button for selecting a photographing mode such as a person photographing mode.

When these switches and buttons are operated, a signal according to the operation is input into the system controller 112.

A SW1, which is turned on by a first stroke operation (half-pressed operation) of the release button operated by a photographer, and a SW2, which is turned on by a second stroke operation (full-pressed operation) of the release button, are connected to the release button.

Figure 2:
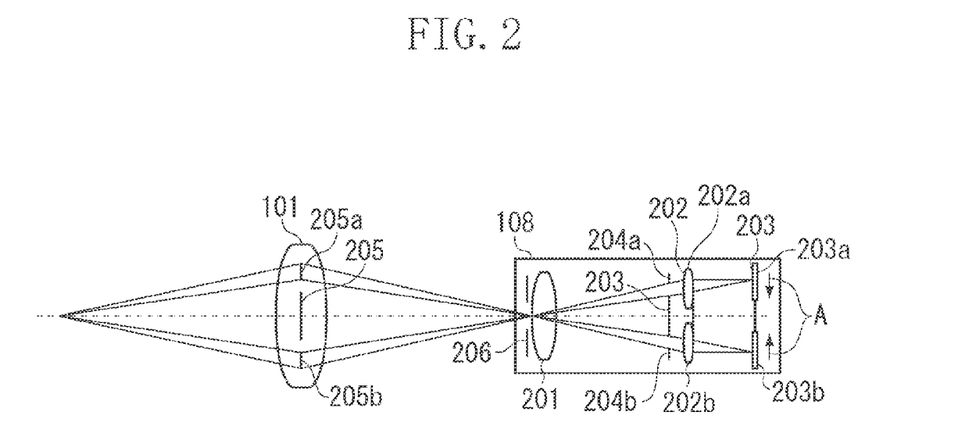
FIG. 2 is a view for describing a detection of a focusing state.

FIG. 2 is a view of an optical path for describing a principle of detecting a focusing state by the system controller 112 with the use of the focus detection device 108. In FIG. 2, the components are disposed on the optical axis of the photographing lens 101. The main mirror 102 and the sub-mirror 106 are omitted. The components in FIG. 2 same as those in FIG. 1 are identified by the same numerals.

<Focusing-State Detection Device 108>

Within the focusing-state detection device 108 in FIG. 2, an expected focal plane 109 of the photographing lens 101, i.e., a field mask arranged in the vicinity of a surface that is conjugate with a film surface, and a field lens 201 is arranged in the vicinity of the expected focal plane. A secondary imaging system 202 includes two lenses 202a and 202b. A photoelectric conversion element 203 is arranged at the rear of two lenses 202a and 202b of the secondary imaging system 202 so as to correspond to these lenses, and includes two line sensor rows 203a and 203b. A diaphragm 204 having two openings 204a and 204b is arranged so as to correspond to two lenses 202a and 202b of the secondary imaging system 202. An exit pupil 205 of the photographing lens 101 includes two divided regions 205a and 205b.

In the configuration described above, when the photographing lens 101 is extended to the left in the figure so that the light flux is imaged at the left from the image sensor 107, a pair of images on the photoelectric conversion element 203 is deviated in the direction of an arrow A. The relative deviation amount of the pair of images is detected by the photoelectric conversion element 203, whereby the defocus amount, serving as the focusing state of the photographing lens 101 as to the subject, is detected, and the focus adjustment of the photographing lens 101 can be performed based on the detection result. When the photographing lens 101 is extended to the right in the figure, a pair of images on the photoelectric conversion element 203 is deviated in the direction opposite to the direction of A in the figure.

<Configuration of Photoelectric Conversion Element 203>

Figure 3A:
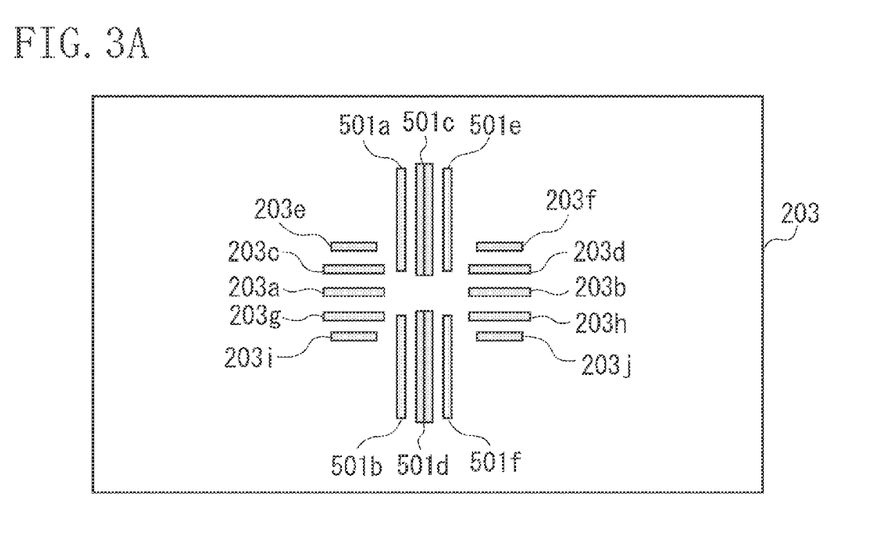
FIGS. 3A and 3B are views illustrating an arrangement of a photoelectric conversion element.
Figure 3B:
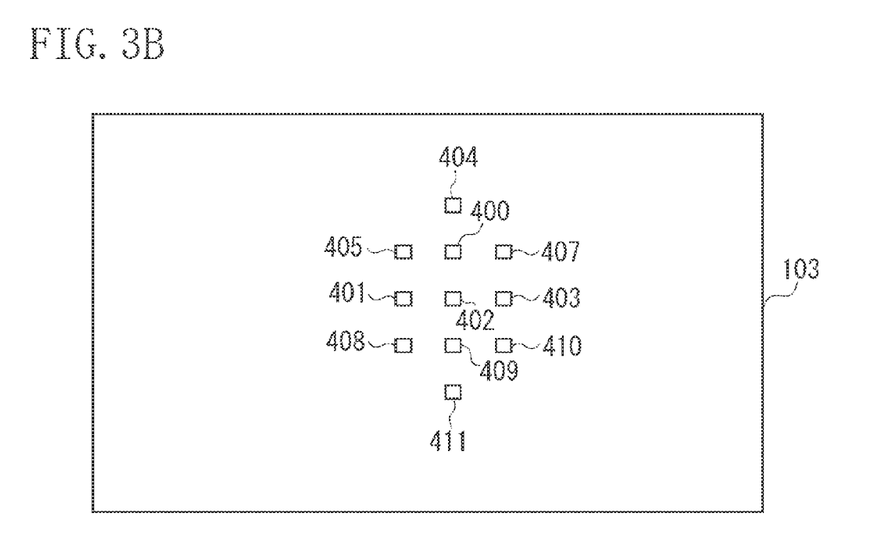

FIG. 3A illustrates the arrangement of the photoelectric conversion element 203 having a pair of line sensor rows 203a and 203b as focusing-state detection areas. The line sensor rows 203c and 203d, the line sensor rows 203e and 203f, the line sensor rows 203g and 203h, and the line sensor rows 203i and 203j, which serve as the focusing-state detection areas, make a pair respectively. The line sensor rows 501a and 501b, the line sensor rows 501c and 501d, and the line sensor rows 501e and 50f, which serve as the focusing-state detection areas, make a pair respectively.

The image deviation amounts can be detected from the signals output from the respective pairs of line sensor rows of the photoelectric conversion element 203.

A group of the pairs of the focusing-state detection areas on the secondary imaging surface corresponds to AF frames 401 to 411 that a user can visually confirm on the focus plate 103 on the primary imaging surface described above. In the present exemplary embodiment, eleven AF frames are employed. However, the invention is not limited thereto.

<Control of Photoelectric Conversion Element 203>

Figure 4:
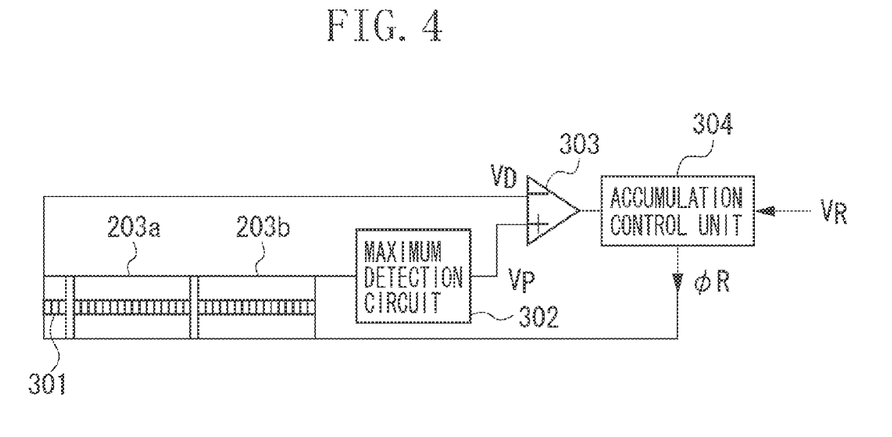
FIG. 4 is a view illustrating the photoelectric conversion element and an accumulation control thereof.

FIG. 4 is a view illustrating the control of the photoelectric conversion element 203 with the use of a pair of line sensor rows 203a and 203b as a representative.

The accumulation control on the photoelectric conversion element 203 will firstly be described. Outputs VD and VP will firstly be described. The output VD means an output from a shielded dark pixel 301 that is common to the line sensor rows 203a and 203b. The output VP means an output from a pixel indicating the maximum value of a maximum value detection circuit 302 that is common to the line sensor rows 203a and 203b. The difference between the output (VD) and the output (VP) is detected and output by an operation amplifier 303.

Signals are accumulated until the difference between the output VD and the output VP reaches a predetermined level (VR), and the accumulation operation is ended at the point when the difference reaches the predetermined level. After the accumulation operation is ended, φR that is a signal read out to an accumulation capacity is sent to the line sensor rows 203a and 203b from an accumulation control unit 304.

The reason why the difference between the maximum value VP and the dark output VD is taken is as follows. Specifically, since signals are accumulated until the maximum value VP reaches the predetermined level VR with the dark output VD defined as a reference, it can be determined that the level by which a sufficient precision is achieved, is attained in the process of detecting the phase difference in the focus detection.

When the accumulation time is increased more than the maximum value VP, the output signal is saturated, so that an appropriate focus detection cannot be performed. Therefore, the read signal φR is fed back to the line sensor rows 203a and 203b.

Figure 5:
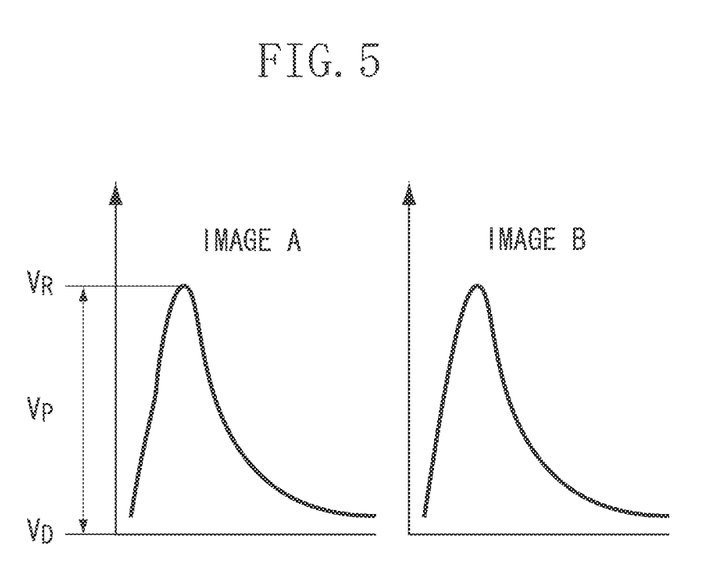
FIG. 5 is a view illustrating the photoelectric conversion element and the accumulation control thereof.

FIG. 5 illustrates the image signals of the line sensor rows 203a and 203b with the output VD of the dark pixel 301 defined as a reference. In FIG. 5, the maximum output VP (at the A-image side in the figure), which is common to an A-image and a B-image that are the image signals of the line sensor rows 203a and 203b respectively, is defined as the set level VR.

The focus state is detected such that the image signal at the point when either one of the line sensor pixels of the line sensor rows 203a and 203b falls within a predetermined space including the set level VR, is used to calculate the relative phase difference between the A-image and the B-image.

<Calculation of Focus Deviation Amount>

A signal processing method for calculating the focus deviation amount will be described, taking the A-image and the B-image output from the above-mentioned line sensor rows 203a and 203b respectively as a representative example.

When the number of pixels constituting the focus-detection pixel is defined as L, an A-image signal is defined as A(i) and a B-image signal is defined as B(i) with the pixel number i (i=0, . . . , L), the formula (1) or the formula (2) are calculated for k1≤k≤k2.

$$X(k) = \sum_{i=0}^{M} \max\{A(i), B(i+|k|+1)\} - \qquad (1)$$
$$\sum_{i=0}^{M} \max\{A(i+1), B(i+|k|)\} \ (k<0)$$
$$= \sum_{i=0}^{M} \max\{A(i+k), B(i+1)\} -$$
$$\sum_{i=0}^{M} \max\{A(i+k+1), B(i)\} \ (k \geq 0)$$
$$= X_1(k) - X_2(k)$$

$$X(k) = \sum_{i=0}^{M} \min\{A(i), B(i+|k|+1)\} - \qquad (2)$$
$$\sum_{i=0}^{M} \min\{A(i+1), B(i+|k|)\} \ (k<0)$$
$$= \sum_{i=0}^{M} \min\{A(i+k), B(i+1)\} -$$
$$\sum_{i=0}^{M} \min\{A(i+k+1), B(i)\} \ (k \geq 0)$$
$$= Y_1(k) - Y_2(k)$$

M is a calculated pixel number represented by (M=L−|k|), k is termed a relative displacement amount, and k1 and k2 are generally defined to be −L/2 and L/2.

The operators of max{a, b} indicates that the greater one is extracted from a and b, while operators of min{a, b} indicate that the smaller one is extracted from a and b.

Accordingly, X1(k), X2(k), Y1(k), and Y2(k) in the formulas (1) and (2) can be considered to be a correlation amount in a broad sense.

With respect to the details of the formulas (1) and (2), X1(k) and Y1(k) represent the correlation amount in the displacement of (k−1), while X2(k) and Y2(k) represent the correlation amount in the displacement of (k+1), respectively, under present circumstances.

Therefore, the evaluation amount X(k) that is the difference between X1(k) and Y2(k) means the amount of change in the correlation amount of the subject-image signals A(i) and B(i) in the relative displacement amount k.

From the above-mentioned definition, the correlation amounts X1(k) and X2(k) become the minimum when the correlation between two images is the highest. Therefore, X(k), which is the amount of change thereof, has to be "0" at the highest correlation, and has to have a negative slope.

However, since the X(k) is discrete data, the focus deviation amount PR not more than the pixel unit can be detected when $$X(kp) \geq 0, X(kp+1) < 0 \qquad (3),$$

by performing an interpolation operation of $$PR=kp+X(kp)/\{X(kp)-X(kp+1)\} \quad (4),$$

considering that the peak of the correlation amount is present at the zone of [kp, kp+1] of the relative displacement where the X(kp)−(kp+1) becomes the maximum. On the other hand, from the above-mentioned definition, the correlation amounts Y1(k) and Y2(k) become the maximum when the correlation between two images is the highest in contrast with the above amounts.

Therefore, Y(k), which is the amount of change thereof, has to be "0" at the highest correlation, and has to have a positive slope. However, as for the Y(k), the focus deviation amount PR not more than the pixel unit can also be detected when $$Y(kp) \le 0, Y(kp+1) > 0 \quad (5),$$

by performing an interpolation operation of $$PR=kp+|Y(kp)/\{Y(kp)-Y(kp+1)\}| \quad (6)$$

From the focus deviation amount PR obtained from the formula (4) or the formula (6), the defocus amount DEF for the expected imaging surface of the subject imaging surface can be obtained from the following formula (7).

$$DEF=K \cdot PR \quad (7)$$

In the formula (7), K is a conversion coefficient determined by the size of an opening angle of a gravity center of the light flux passing through a pair of focusing pupils.

<Positional Relationship Between Photoelectric Conversion Element 203 and Respective Focusing-State Detection Areas>

Figure 6:
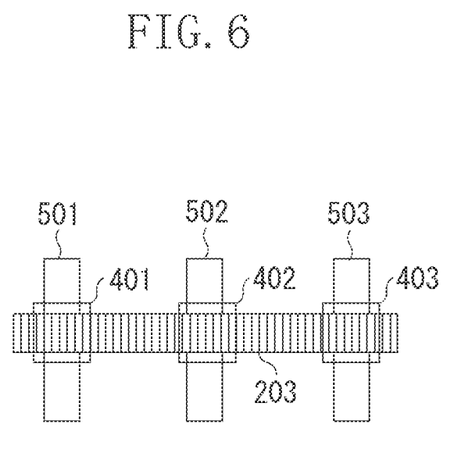
FIG. 6 is a view illustrating a positional relationship between a pair of photoelectric conversion elements and a focusing point according to the exemplary embodiment.
Figure 7A:
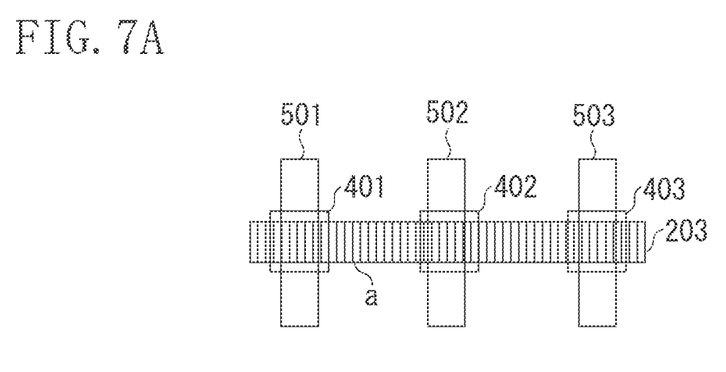
FIGS. 7A, 7B, and 7C are views illustrating an AF frame and a focusing-state detection area according to the exemplary embodiment.
Figure 7B:
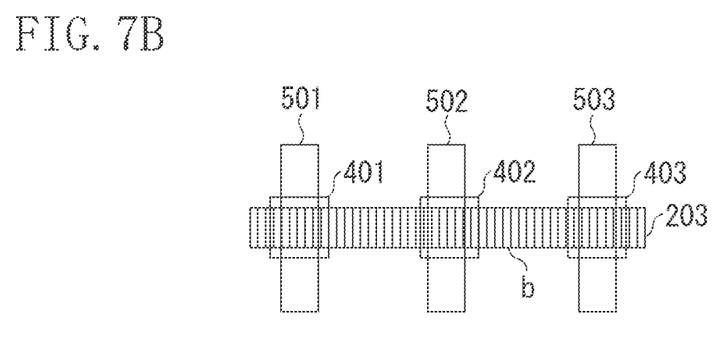
Figure 7C:
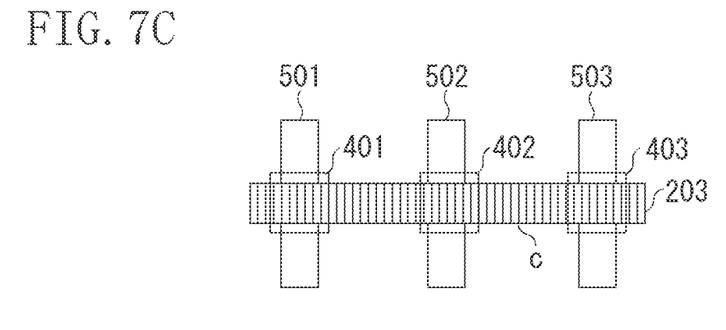

FIG. 6 is a diagram illustrating the positional relationship among the photoelectric conversion element 203, respective focusing-state detection areas, and AF frame. FIG. 7 is a diagram for describing a range where the focus deviation amount is detected in the respective focusing-state detection areas.

FIG. 6 illustrates three representative AF frames 401, 402, and 403 among the AF frames that can be visually confirmed by a user with the focus plate 103 on the primary imaging surface. The AF frame is the area defined on the primary imaging surface. The user can grasp the position of the AF frame on the imaging screen by using the focus plate 103 or the display device 121.

Figure 8:
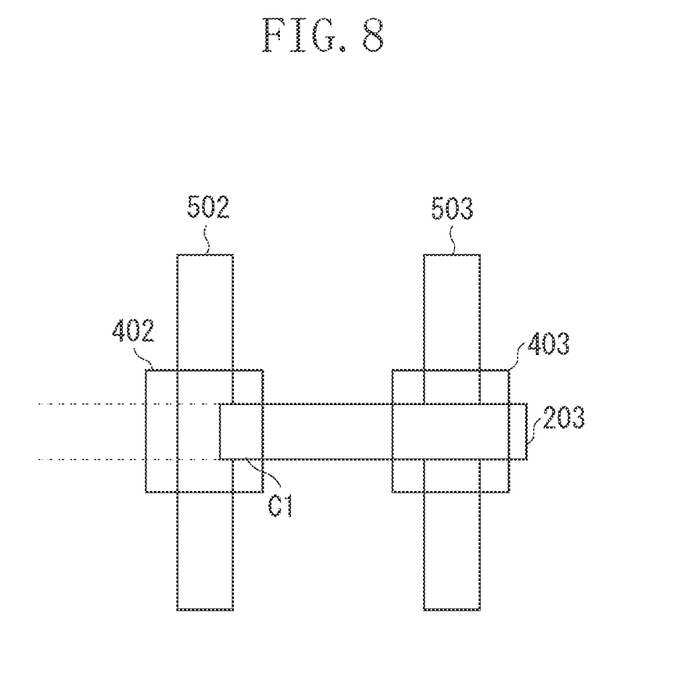
FIG. 8 is a view illustrating an overlap of the focusing-state detection area and the AF frame according to the exemplary embodiment.

The focusing-state detection area corresponding to the AF frame 401 is the area of the pair of 203a and 203b and the area of the pair of 501a and 501, as described in FIG. 3, of the photoelectric conversion element 203. These areas are 501 on the primary imaging surface (FIGS. 6 to 8). The areas of the pair of 203a and 203b and the pair of 501a and 501b of the photoelectric conversion element 203 are referred to as a cross-type, corresponding to a lateral line and a vertical line. Similarly, the focusing-state detection area corresponding to the AF frame 402 is the area of the pair of 203a and 203b and the area of the pair of 501c and 501d of the photoelectric conversion element 203. The area of the pair of 501c and 501d is 502 on the primary imaging surface (FIGS. 6 to 8). The focusing-state detection area corresponding to the AF frame 403 is the area of the pair of 203a and 203b and the area of the pair of 501e and 501f of the photoelectric conversion element 203. The area of the pair of 501e and 501f is 503 on the primary imaging surface (FIGS. 6 to 8). The line sensor rows 203a and 203b of the photoelectric conversion element 203 cuts out three focusing-state detection areas from the output as described below. Thus, the system controller 112 detects the focusing state of the optical system as to the subject on the AF frames 401, 402, and 403, which are three different areas in the corresponding subject space, by using the signal cutting out the areas.

Specifically, the AF frames 401, 402, and 403 correspond to the so-called cross-type focusing-state detection areas. This is the focus detection apparatus including three photoelectric conversion elements, which are 501a and 501b, 501c and 501d, and 501e and 501f (they are vertical lines) orthogonal to the photoelectric conversion elements 203a and 203b (they are lateral lines). The cross-type apparatus includes an X-type apparatus and an apparatus having both X-type and +-type. To simplify the description, the +-type apparatus will be described.

In this case, the focusing-state detection areas 203a and 203b as well as the focusing-state detection areas 501a and 501b of the photoelectric conversion element 203 are associated with the AF frame 401 as illustrated in FIG. 7A. Similarly, as illustrated in FIG. 7B, the focusing-state detection areas 203a and 203b as well as the focusing-state detection areas 501c and 501d of the photoelectric conversion element 203 are associated with the AF frame 402. Similarly, as illustrated in FIG. 7C, the focusing-state detection areas 203a and 203b as well as the focusing-state detection areas 501e and 501f of the photoelectric conversion element 203 are associated with the AF frame 403.

Therefore, in a predetermined case, the focusing state is detected by using the output from the focusing-state detection areas of the photoelectric conversion elements 501e and 501f and the output from the focusing-state detection area of an area c within a predetermined range of the photoelectric conversion elements 203a and 203b. The predetermined case means a case where a user intends to focus the photographing lens 101 on a subject with the AF frame 403, for example. Similarly, the focusing states of the focusing points 401 and 402 are detected by using the output from areas a and b within a predetermined range of the corresponding photoelectric conversion elements 203a and 203b.

In FIG. 7A, the focusing-state detection area in the area a is overlapping with the AF frame 402, which is not the associated AF frame 401, on the primary imaging surface. Similarly, in FIG. 7C, the focusing-state detection area in the area c is overlapping with the AF frame 402, which is not the associated AF frame, on the primary imaging surface.

A painted area c1 in FIG. 8 indicates the partial area where the focusing-state detection area is overlapping with the AF frame 402 in the area c (the area c is the area corresponding to the AF frame 403). With this, the cut-out area of the photoelectric conversion element 203 can be increased in the AF frames 401 and 403. Therefore, a defocus amount (focus deviation amount) greater than in a case where the area is not increased can be detected.

In this case, if an autofocus is performed on one point in the AF frame 403, it is to be considered how to control the lens by using the output from the focusing-state detection area (vertical line) of the photoelectric conversion elements 501a and 501b and the output from the area c (lateral line) of the photoelectric conversion elements 203a and 203b. Here, the output having high reliability according to the contrast evaluation value or the degree of agreement between the A-image and the B-image is selected from the respective outputs so as to control the lens. This will be described below.

<Flowchart>

Figure 9:
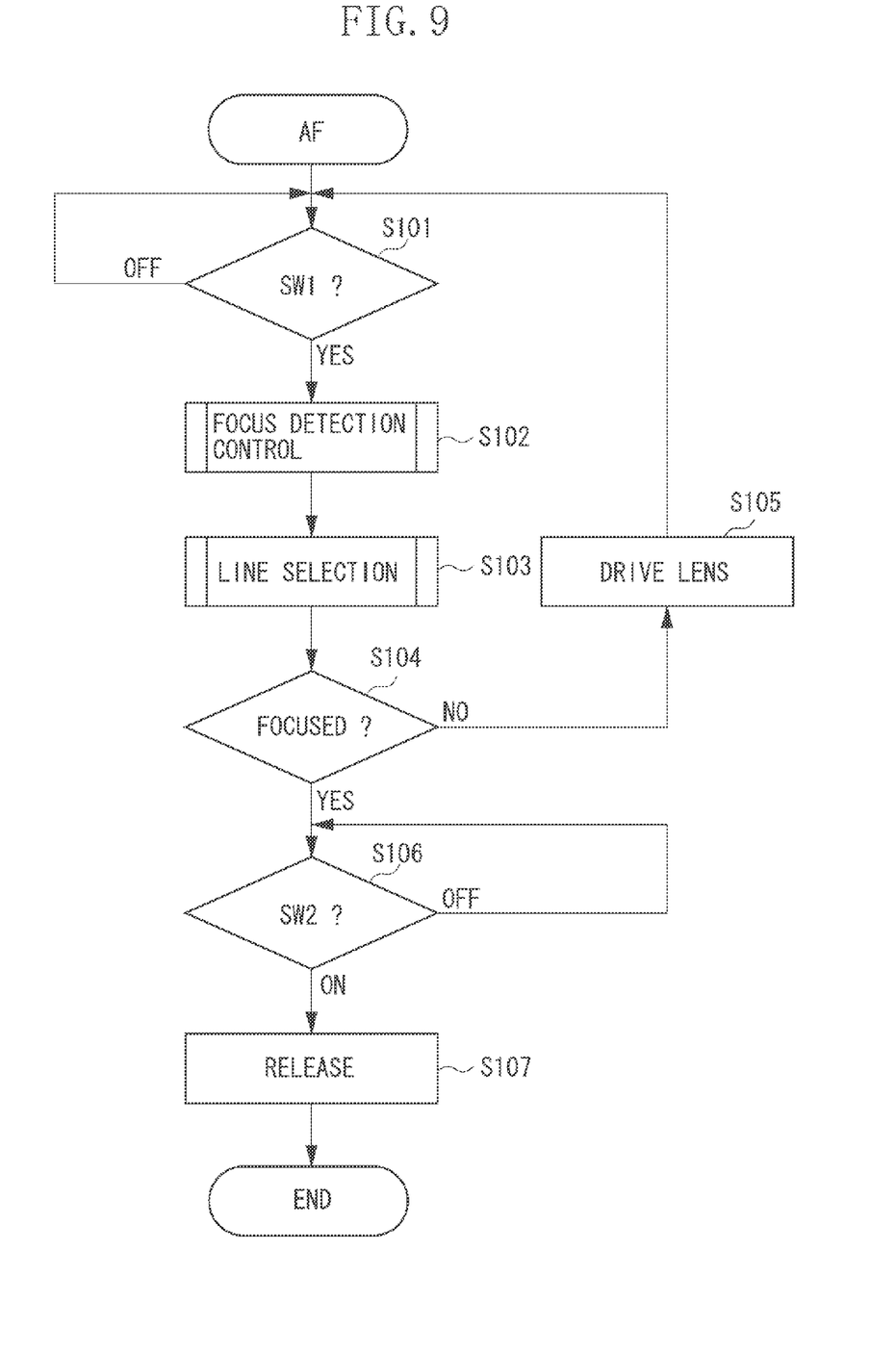
FIG. 9 is a flowchart illustrating an operation of the imaging apparatus according to the exemplary embodiment.

Subsequently, a control flow according to the first exemplary embodiment will be described with reference to FIG. 9. In step S101, the system controller 112 firstly determines whether the SW1, which is one of the operation members, is pressed. If the release button SW1 is not pressed (NO in step S101), the processing is repeated until the release button SW1 is pressed. On the other hand, when the release button SW1 is pressed (YES in step S101), the processing proceeds to step S102. In step S102, an accumulation control of the necessary area of the above-mentioned photoelectric conversion element 203 is performed. The necessary accumulation control is performed on the area selected from the line sensor rows 203c and 203d, 203e and 203f, 203g and 203h, and 203i and 203j, as well as from the line sensor rows 501a and 501b, 501c and 501d, and 501e and 501f. The focusing state is detected based upon the output of the selected focusing-state detection area. In step S103, the result of the focusing-state detection in one of areas (line sensor rows) where the detection of the focusing state is performed, is selected among a plurality of the selected focusing-state detection areas. The selection of the result of the focusing-state detection will be described below.

In step S104, it is determined whether one focal state selected in step S103 is in focus. If it is not in focus (NO in step S104), the processing proceeds to step S105. On the other hand, if it is in focus (YES in step S104), the processing proceeds to step S106.

In step S105, the system controller 112 converts the defocus amount, which is the focal state detected in step S103, into a pulse number that is a drive amount of the lens, and drives the photographing lens 101 by the lens drive device 113. Thus, there is substantially no defocus amount before the drive, so that the photographing lens 101 is focused on the subject. In step S106, the system controller 112 determines whether the SW2, which is one of the operation members, is pressed. If the release button SW2 is not pressed (NO in step S106), the processing in step S106 is repeated. On the other hand, if the release button SW2 is pressed (YES in step S106), the processing proceeds to step S107. In step S107, the system controller 112 drives the main mirror 102 to the outside of the photographing light flux through the mirror drive circuit 114, and drives the image sensor 107 through the image sensor drive device 116 so as to output the image signal data. Thus, the image of the subject is captured, and recorded as an image file as previously described.

<Selection of Result of Focusing-State Detection>

Figure 10:
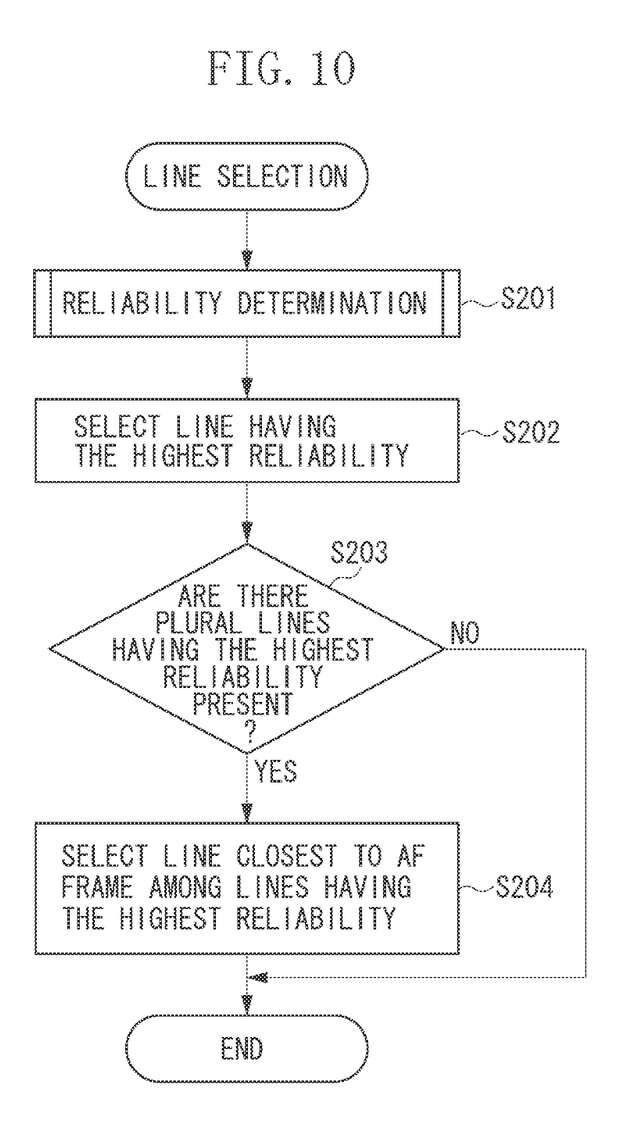
FIG. 10 is a flowchart for describing a selection of an output according to the exemplary embodiment.

The selection of the result of the focusing-state detection in step S103 in FIG. 9 will be described with reference to the flowchart in FIG. 10.

Here, a user selects the AF frame 403, which is a cross-type AF frame, as a representative example. It is supposed that the camera selects either one of an output A1 and an output A2. The output A1 means the output from the focusing-state detection areas 501e and 501f of the photoelectric conversion element 203 in FIG. 7C. The output A2 means the output from the focusing-state detection areas 203a and 203b of the photoelectric conversion element 203 in FIG. 7C. There are two outputs A1 and A2 in the present exemplary embodiment. However, if there are focusing-state detection areas corresponding to eight AF frames like the above-mentioned photoelectric conversion element 203, the outputs of A1 to A8 are supposed to be provided.

In step S201, a determination of reliability of each line is firstly performed. The reliability determination will be described below with reference to the flowchart in FIG. 11. In FIG. 10, after the reliability determination in step S201, the detection result having relatively high reliability (Sn) is selected in step S202. Here, the result of the focusing-state detection that is the closest to 0 is selected.

In step S203, it is checked whether there are plural lines having the highest reliability. If so, the detection result in which the focusing state is located at the closest distance is selected from the lines having the highest reliability. To simplify the description, the user selects the AF frame 403, which is the cross-type AF frame, as a representative example. However, the result of the focusing-state detection for controlling the lens 101 is similarly selected from the plural AF frames.

<Reliability Determination>

The reliability determination in step S201 in FIG. 10 will be described.

Figure 11:
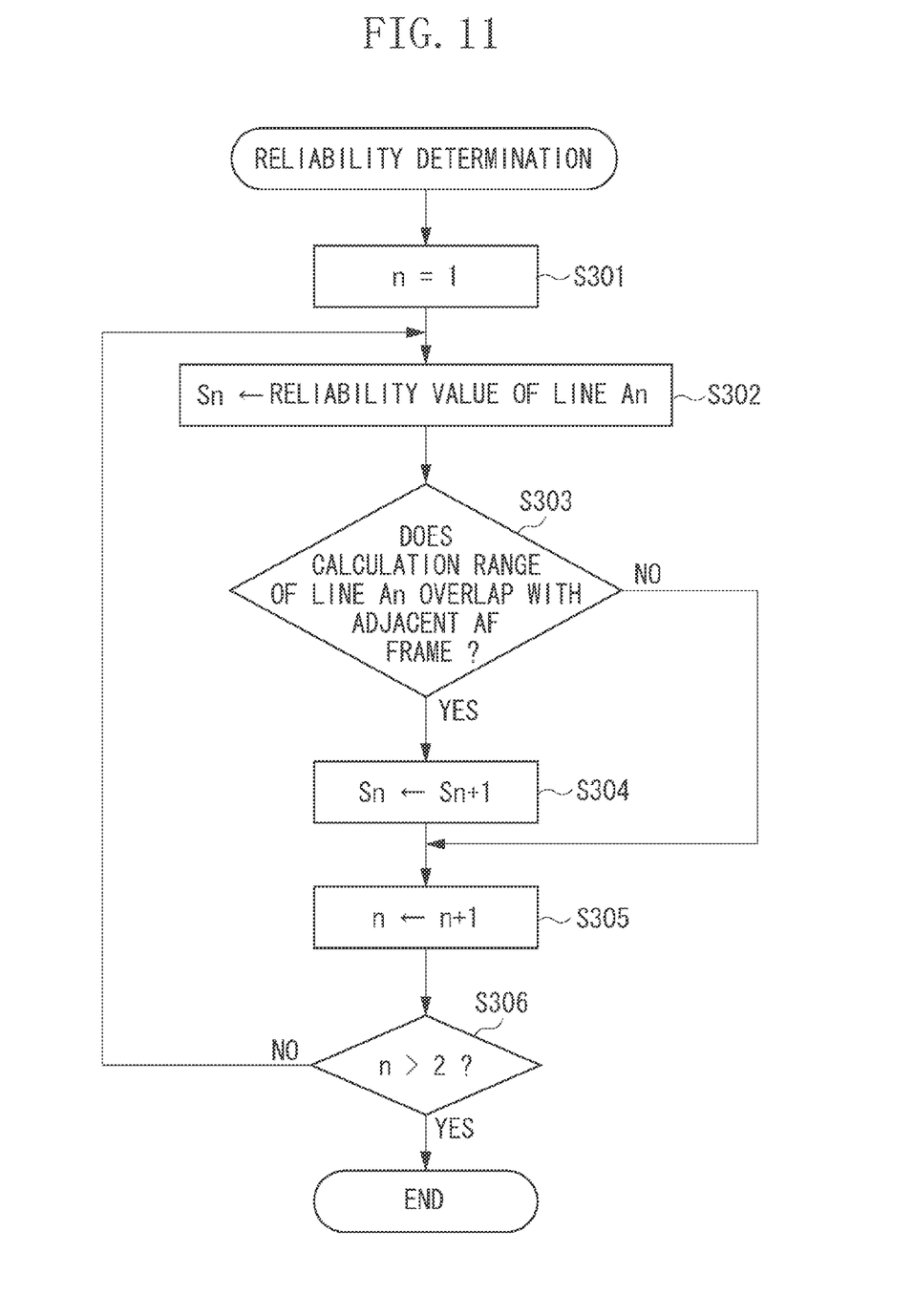
FIG. 11 is a flowchart for describing a determination of reliability according to the exemplary embodiment.

In step S301, an initial value, one, is substituted for n, and in step S302, the reliability value of the output An is set to Sn. The Sn is the value according to the degree of agreement between the A-image and the B-image in the output from the corresponding focusing-state detection area, or a contrast of the sensor image. The value closer to 0 indicates high reliability. The reliability value indicates the reliability in the detection result upon detecting the phase difference between the A-image and the B-image. For example, the more the shapes of the images agree with each other, the more accurate the detection of the phase difference.

In step S303, it is determined whether a certain focusing-state detection area is overlapping with the focusing-state detection area of the AF frame that is adjacent to the corresponding AF frame on the primary imaging surface. For example, it is determined whether a certain focusing-state detection area has the area like the area c1 in FIG. 8. The state in which the focusing-state detection area is overlapping on the primary imaging surface, is equivalent to the state in which the calculation range using the output from the focusing-state detection area corresponding to a certain AF frame is overlapping with the calculation range using the output from the focusing-state detection area corresponding to another AF frame.

If they are overlapping (Yes in step S303), one is added to Sn. If not (No in step S303), no change is made. The area c of the focusing-state detection areas 203a and 203b of the photoelectric conversion element 203 has the area c1 that is overlapping with the adjacent AF frame 402. Accordingly, one is added to a reliability value S2.

Thereafter, in step S305, n is incremented. When n is greater than two in step S306 (Yes in step S306), the processing is ended. If not (No in step S306), the processing returns to step S302. Since the user selects the AF frame 403, which is the cross-type AF frame, as a representative example, n becomes two. However, when the output used for controlling the photographing lens 101 is selected from the outputs of the focusing-state detection areas corresponding to the plural AF frames, the value of n is changed according to the number of the focusing-state detection areas.

As described above, the reliability of the line (in this example, the line A2), of the output A1 and the output A2, in which the calculation range thereof is overlapping with the adjacent focusing point is reduced, and the reliability of the other line in which the calculation range is not overlapping with the adjacent focusing point is increased. As a result, the output A2 is difficult to be selected. Specifically, the output from the focusing-state detection area overlapping with the non-corresponding AF frame 402 on the primary imaging surface is difficult to be selected as the output used for controlling the photographing lens 101.

<Others>

In the above-mentioned exemplary embodiment, the output of the focusing-state detection area for controlling the photographing lens 101 is selected based upon the reliability. When the focusing-state detection area is overlapping with the non-corresponding AF frame, for example, the output of the focusing-state detection area may be selected only when the focusing state cannot be detected from the output of the other focusing-state detection areas. In this case, it is highly possible that the output of the focusing-state detection area overlapping with the non-corresponding AF frame is not selected.

Although the selection from the lateral line and the vertical line in the cross has been described in the above-mentioned exemplary embodiment, the invention is not limited thereto. For example, it is also effective even when the focusing-state detection areas respectively corresponding to the plural AF frames are on only the lateral line.

According to the present exemplary embodiment, when there is the focusing-state detection area whose calculation range is overlapping with the adjacent AF frame on the vertical line/lateral line of the cross focusing points, the reliability of the output from this area is reduced to automatically lower the order of priority. Thus, the focusing-state detection area whose calculation range is not overlapping with the adjacent AF frame is preferentially selected. As a result, the present invention can eliminate the drawback that the photographer focuses the photographing lens 101 on a subject corresponding to the AF frame not chosen by the photographer.

The present invention aims to reduce the drawback in which a subject corresponding to the AF frame not desired by a user is focused.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-200243 filed Aug. 31, 2009, which is hereby incorporated by reference herein in its entirety.

What is claimed is:

1. An apparatus that detects a focusing state of an optical system based on a detection area of a photoelectric conversion element including a plurality of pixels receiving a light flux from a subject space, the apparatus comprising:
a selection unit configured to select, from outputs of the detection areas, an output of the detection area for controlling the optical system based on a reliability value of the output, wherein detection areas are related to a plurality of AF frames respectively; and
a controller configured to control a drive of the optical system based on the selected output,
wherein the selection unit makes it difficult to select, from the plurality of detection areas, an output having a part overlapping with an AF frame, on a primary imaging surface, compared to an output not having the overlapping part, and
wherein the reliability value is updated in a case where the output has the part overlapping with the AF frame and the reliability value is not updated in a case where the output does not have the overlapping part.

2. The apparatus according to claim 1, wherein the plurality of detection areas is provided for a single AF frame.

3. The apparatus according to claim 1, wherein the detection area for a single AF frame is a cross-type including a vertical detection area and a lateral detection area.

4. An imaging apparatus having the apparatus according to claim 1, comprising:
an imaging unit; and
a recording unit configured to capture an image of a subject passing through the optical system driven in the apparatus, and to record the captured image as an image file.

5. The apparatus according to claim 1, wherein the reliability value indicates reliability in a detection result upon detecting a phase difference between two images.

6. A control method of an apparatus that detects a focusing state of an optical system based on a detection area of a photoelectric conversion element including a plurality of pixels receiving a light flux from a subject space, the method comprising:
selecting, from outputs of the detection areas, an output for controlling the optical system based on a reliability value of the output, the detection areas corresponding to a plurality of AF frames respectively, and
when the optical system is driven based on the selected output, performing control to make it difficult to select, from the plurality of detection areas, an output having a part overlapping with an AF frame, on a primary imaging surface, compared to an output not having the overlapping portion, wherein
the reliability value is updated in a case where the output has the part overlapping with the AF frame and the reliability value is not updated in a case where the output does not have the overlapping part.

7. The method according to claim 6, further comprising providing the plurality of detection areas for a single AF frame.

8. The method according to claim 6, wherein the detection area for a single AF frame is a cross-type including a vertical detection area and a lateral detection area.

9. The method according to claim 6, further comprising:
a recording unit configured to capturing an image of a subject passing through the optical system; and
recording the captured image as an image file.

10. The method according to claim 6, wherein the reliability value indicates reliability in a detection result upon detecting a phase difference between two images.

11. An apparatus that detects a focusing state of an optical system based on a detection area of a photoelectric conversion element including a plurality of pixels receiving a light flux from a subject space, the apparatus comprising:
a selection unit configured to select, from outputs of the detection areas, an output of the detection area for controlling the optical system based on a reliability value of the output, wherein detection areas are related to a plurality of AF frames respectively, wherein the reliability value varies on whether the output has the part overlapping with a different AF frame; and
a controller configured to control a drive of the optical system based on the selected output.

12. The apparatus according to claim 11, wherein the plurality of detection areas is provided for a single AF frame.

13. The apparatus according to claim 11, wherein the detection area for a single AF frame is a cross-type including a vertical detection area and a lateral detection area.

14. An imaging apparatus having the apparatus according to claim 11, comprising:
an imaging unit; and
a recording unit configured to capture an image of a subject passing through the optical system driven in the apparatus, and to record the captured image as an image file.

15. The apparatus according to claim 11, wherein the selection unit makes it difficult to select, from the plurality of detection areas, an output having a part overlapping with different AF frame compared to an output not having the overlapping part.

* * * * *